FILM SCANNING FOR TELEVISION REPRODUCTION

Filed March 29, 1963

INVENTOR.
BERNARD ERDE

BY
Brumbaugh, Free, Graves & Donohue his ATTORNEYS

United States Patent Office 3,410,954
Patented Nov. 12, 1968

3,410,954
FILM SCANNING FOR TELEVISION REPRODUCTION

Bernard Erde, Stamford, Conn., assignor to Columbia Broadcasting System, Inc., New York, N.Y., a corporation of New York
Filed Mar. 29, 1963, Ser. No. 268,911
26 Claims. (Cl. 178—7.2)

This invention relates to film scanning techniques, and, more particularly, to a method of scanning a moving record medium carrying information thereon in successive frames in which each frame is scanned once by an interrogating beam which repeatedly scans a single predetermined area.

The scanning method is particularly useful in obtaining television information from cinematographic film, but is applicable as well to any situation wherein it is desired to scan information recorded in successive frames of a record medium in which the number of frames of the record medium to be scanned in a given time is unequal to the number of scansions made by scanning apparatus in that time. In other words, the method of the invention may be employed in any situation in which the original film medium is incompatible as to time with the scanning apparatus.

An example of the incompatibility between a record medium and scanning equipment is found in the production of cinematographic film for television transmission. At the present time cinematographic film is exposed and, of course, reproduced at a rate of 24 frames per second, whereas the conventional raster type flying spot cathode ray tube scans 60 fields or rasters per second. To produce a signal utilizable for television, one method provides an intercalated, release print of the original film in which every fourth frame is duplicated, thereby resulting in 30 frames containing the same information originally carried in 24 frames. The intercalated film is then scanned using a scanning-chasing process in which each frame is scanned twice using special equipment, the film being conveyed through the scanning area at a rate of 30 frames per second. During a $\frac{1}{60}$ second interval, a frame moves downward $\frac{1}{2}$ of its pitch while the raster scanning-spot image, which starts at the leading edge of the frame (the top of the inverted image on the film), moves upward $\frac{1}{2}$ frame pitch, thereby resutling in a vertical scan of one full frame. During the blanking period, a shutter and a suitable optical system, which may comprise mirrors, lenses or prisms suitably disposed to form two images of the raster in the film plane at the proper center to center chasing interval, shift the raster scanning-spot image downward to the leading edge of the same frame. During the next $\frac{1}{60}$ second this frame is again scanned as it moves another $\frac{1}{2}$ frame pitch by an upward $\frac{1}{2}$ frame movement of the scanning raster spot image, this scansion being electronically interlaced with the first, that is, the lines being traced between lines of the first scansion. This sequence is continued so that each of the frames is scanned twice as it traverses the scanning area.

It will be apparent that the above-described method involves delicate and expensive equipment, particularly, the high-resolution and finely adjusted optical system as well as the shutter and film drive apparatus and associated synchronization control. Moreover, because of the complex optical system, light intensity is reduced and resolution is decreased.

To eliminate chasing it has been proposed to prepare an intercalated release film of the type described above wherein all of the frames are duplicated so that the film frame rate is the same as the scanning frame rate. This arrangement, however, requires a special type of high intensity line scan generator which, to prevent burning of the line in the screen, must either have a movable phosphor screen or be operated at low current intensity. In either case, the equipment has the disadvantage of complexity and high cost.

It has also been proposed to convey a film having alternate frames duplicated through a scanning area and to scan the film in the direction opposite to the film movement. Three frames are scanned during each scansion in adjacent, noncoincident raster-image areas, every third frame being scanned once and the others being scanned twice. In this method, scanning nonlinearities and distortions can cause subsequent poor image registration.

The above-described and other disadvantages of the foregoing methods are overcome by providing, in accordance with the invention, a scanning method in which a scanning raster scans each image of a record medium only once as it traverses a single scanning area essentially defined by the raster. In accordance with one form of the invention, a new record medium is used in which at least some of the frames of the first medium are intercalated to produce the number of frames required to pass a single frame through the scanning area during each scansion without distorting the time relationship of the recorded information. In order to adapt the method of conventional film running and scanning equipment, a film reproduction or release print may also be anamorphosed in the direction of film movement. Furthermore, to synchronize the scanning rate with the rate of film movement, the record medium may have, recorded between frames, synchronizing indicia of a type which normally does not occur in the information recorded within the frames so that, when the record medium is scanned continuously, the indicia initiate the retrace of the scanning raster.

The record medium is moved in scanning relation to a scanning raster having a dimension in the direction of movement equal to twice the pitch distance between frames at a rate such that each frame will be completely scanned during each scansion, in other words, a rate at which a given point on each frame traverses a distance equal to the pitch distance between successive frames during the period of time required for each scansion. Each frame is scanned once in the direction of film movement by an interrogating beam. Inasmuch as the scansion is made in the same direction as the record medium moves, it is necessary that the record medium carry its information in erect orientation, i.e. with the bottom of the frame at the leading edge with respect to the direction of motion, rather than inverted, as for example, in cinematographic film images. The foregoing method may also be adapted to reproduce information carried by a scanning beam onto a record medium.

A detailed description follows of an exemplary method of the invention described in general terms above, which is to be read in conjunction with the figures of the accompanying drawings, in which.

Figure 1:
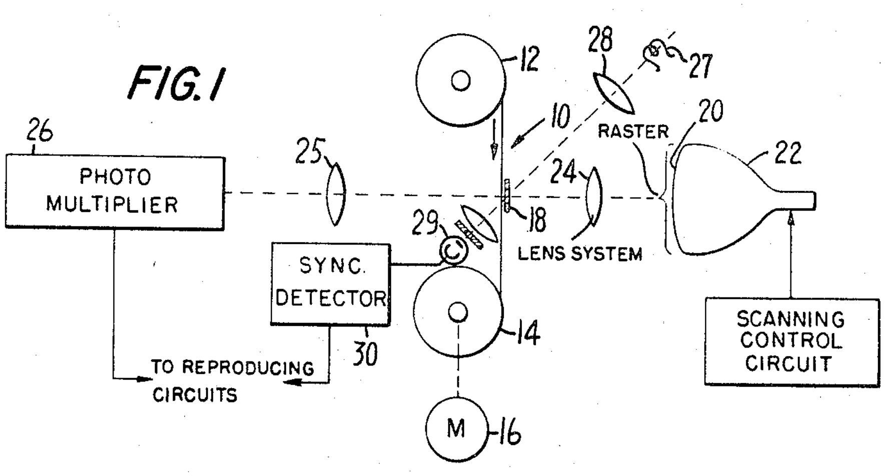
FIG. 1 is a schematic diagram of apparatus which may be employed to carry out the exemplary process.

As an example of the method, the reproduction of cinematographic film for television will be described. By the apparatus shown in FIG. 1, a film 10 is conveyed from a supply reel 12 through a take-up reel 14 driven by a motor 16. As will be described in greater detail below, the film 10 traverses a scanning area 18 on which a moving spot of light defining a raster image on face 20 of a cathode ray tube 22 is directed. Suitably focused on the desired area through a lens system 24, the scanning beam passes through the film image where it is modulated according to the density gradations of the image. The modulated beam is directed by a collecting lens system 25 onto a photo-multiplier 26 which transforms the light beam into a signal representative of the information carried on the film 10. The signal is then transmitted to reproducing circuits. In addition, a separate source of light 27, focused by a lens 28 directs light through the film 10 at an angle to the axis of the lens systems 24 and 25 to a photocell 29 connected to a synchronizing signal detector circuit 30. This circuit is arranged to respond to the synchronizing indicia recorded between frames which are uniquely different from any information recorded within the frames to initiate retrace of the vertical scanning motion and, accordingly, this system may be arranged to scan the frames as well as the spaces between them.

Figures 2A, 2B, 3A, 3B, 3C, 3D:
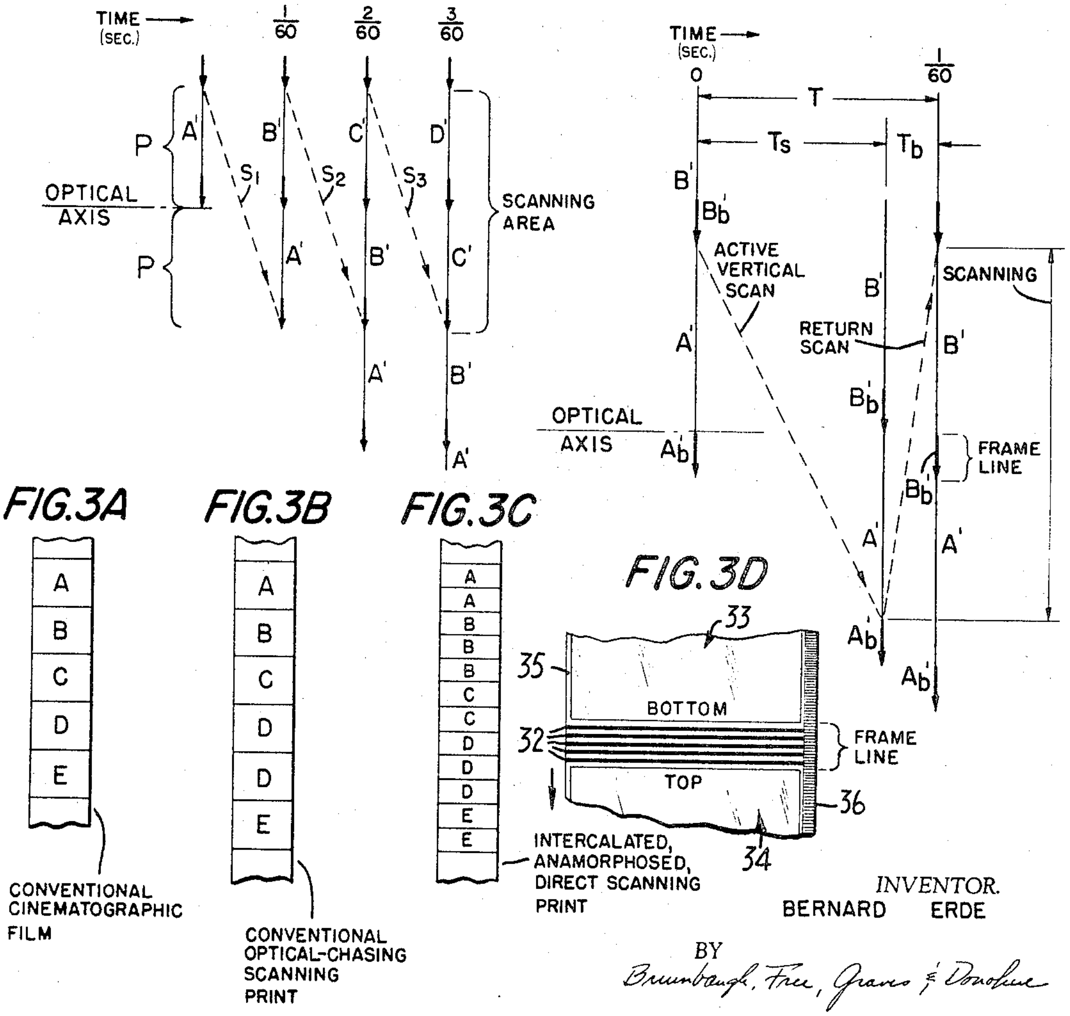
FIG. 2A is a diagram depicting film movement and corresponding scanning as a function of time.
FIG. 2B is a detailed diagram showing a single scan and corresponding film movement indicating the return scan during the blanking period.
FIGS. 3A, 3B and 3C show, respectively, strips of conventional cinematographic film, conventional intercalated film and film intercalated, anamorphosed and inverted used in the method of the invention.
FIG. 3D is a magnified view of a typical film record bearing synchronizing indicia according to the invention.

Referring to FIG. 2A, the vertical lines represent edge views of a moving film, each line, moving from left to right, representing the film position after successive 1/60 second intervals. The frames A′, B′, C′, and D′ are defined by the portions of the vertical lines subtended by the arrow heads. As will be readily apparent, the frame size is equal to the pitch P, neglecting for the moment the spaces between the frames recorded on the film. The scansions are represented by the diagonal dotted lines $S_1$, $S_2$, and $S_3$.

The film traverses the scanning area which, as shown in FIG. 2A, has a height equal to twice that of the frame pitch P at a rate such that a frame traverses a distance equal to the frame pitch P during each scansion $S_1$, $S_2$, and $S_3$. The scanning area is centered on the optical axis of the lens system 24. The active vertical scansion begins at the top of frame A′ and moves vertically, while oscillating horizontally, to the bottom of frame A′ during 1/60 second. At this time the top of frame B′ will occupy the point previously occupied by the top of frame A′, and the return scansion, initiated by detection of the indicia between frames, moves the spot to the top of frame B′ during blanking. During the movement of frame B′ a full pitch distance P the second scansion $S_2$, interlaced between the lines of scansion $S_1$, takes place. The return scansion moves the spot to the top of the frame C′ which now is in position for scansion $S_3$. The process is repeated so that each frame of the film is scanned once during its movement through a full pitch distance P, every other scansion interlaced with the previous scansion.

While the above paragraph describes the scanning process in a simplified form, FIG. 2B illustrates diagrammatically a form of scansion which takes into account the blanking of the signal from the photo-multiplier 26 to eliminate reproduction of the portion thereof representative of the synchronizing indicia recorded on the film in the frame lines or intervals between image portions of the frames. The active scansion takes place during the time $T_s$ which it takes for the scanning beam to traverse the image portion of the frame. The beam returns to the top of the raster during the blanking time $T_b$. It will be clear of course that the film speed is the same as that illustrated in FIG. 2A and that the return scan takes place during the time which it takes for the frame lines $A_b'$ and $B_b'$ to move a distance equal to their dimension in the direction of motion.

Conventional film, illustrated in FIG. 3A, contains individual inverted images A, B, C, D and E which are exposed, according to present standards, at 24 frames per second. In one film scanning technique now used, intercalated release prints, illustrated in FIG. 3B, are made in which every fourth image D, for example, is duplicated, resulting in a release print which is run at 30 frames per second. As indicated previously, for television reproduction, each frame of this print is scanned twice, using optical chasing. In accordance with the present invention, the film medium contains the original information in a number of frames such that each frame is scanned once. Thus, as shown in FIG. 3C, a release film print is made in which the images of the original film are repeated in alternate series of two and three adjacent frames to obtain a two to five intercalation, that is, so that the time relationship of the information contained in 24 frames of the original is retained in 60 frames of the print. In the example illustrated, therefore, frames A, C and E are duplicated in the print, while original frames B and D are repeated three times in adjacent frames.

In addition to being intercalated, the images in the release print are preferably in erect or uninverted orientation as indicated in FIG. 3D rather than inverted, as in conventional film, so that the scan, which is in the direction of film movement, begins at the top of each frame. An uninverted image can be obtained by using an inverting reflective surface in the optical path during the printing of the release print, or by running the original and release films in opposite directions and with the emulsion surfaces opposed.

While the film print may be made with conventional size frame, it is advantageous to anamorphose or compress the frames of the release print in the direction of film movement, preferably by reducing the vertical dimension of each frame as well as the spaces between frames by ½ or more so that the linear rate of film movement is the same as for the 30 frames per second used at the present time. This enables not only a saving of one half in film costs but also makes possible the use of presently available film running equipment. It will be understood that, because the film print images are reproduced by scanning rather than by optical system, the degree of compression or anamorphosing of the frames may be considerably greater than the maximum degree of compression of prints which are to be restored optically to normal proportions. Accordingly, the word "anamorphosed" as used in the specification and claims herein is not restricted to any particular degree of compression.

To further reduce the space occupied by a given film record, the record medium may, for example, be made of a material such as "Mylar" having a thickness of about 1 mil and a width of the order of ¼ inch. In this case, the sprocket holes usually provided in photographic materials are preferably eliminated so that each information frame occupies almost the full width of the strip and, to synchronize the scanning rate with the film motion, the record medium carries synchronizing marks at locations associated with the frame lines or intervals between frames. Moreover, to permit amplification of the signals represented by these marks, by the same reproducing circuits utilized for the information recorded within the frames, the recorded synchronizing signals are preferably of a separably different character from the information recorded in the frames. Furthermore, in film records having synchronizing marks photographically recorded in the spaces between the frames, the use of marks having a separably different character allows continuous scanning of the film record by a synchronizing mark detector without causing actuation of the deteector by any information recorded in the frames.

In the typical example shown in FIG. 3D, the synchronizing mark comprises a plurality of transverse lines 32 photographically recorded in the space between adjacent frames 33 and 34. These lines extend the full width of the frames and into the margin 35 on one side, the other margin being occupied by a sound track 36 which may be either a magnetic stripe of a photographic track of the usual type. The lines 32 comprising the synchronizing mark in the illustrated embodiment are separated by lines of contrasting density and are preferably spaced uniformly in the direction of motion of the record strip which is indicated by the arrow in FIG. 3D so as to generate a signal of constant frequency in the synchronizing signal detector 30, as the lines pass the photocell 29. Alternatively, the transverse lines comprising the synchronizing mark may be distributed in the direction of motion of the record strip according to any other selected pattern, so as to generate a signal of varying frequency as they pass the photocell 29.

Furthermore, although the synchronizing marks are shown as extending the full width of the image area on the film, they may extend only part of the frame width if the view of the detecting photocell 29 is correspondingly reduced. It should be apparent, however, that where the detecting photocell scans at least a portion of the frames as well as the locations of the marks, as in the illustrated embodiment, any reduction of the length of the lines forming the synchronizing mark increases the possibility of an identical pattern appearing in the corresponding region of an information image within one of the frames, which would erroneously initiate the vertical scan.

If there is sufficient unused space in the margin 35 between the sides of the frames and the edge of the record strip, of course, only the portions of the synchronizing marks which extend into that region of the film, as shown in FIG. 3D, need be scanned by the photocell 29 so that the photocell is not responsive to any part of the information recorded in the frames, and in such cases, the synchronizing marks may be restricted to the width of the margin 35. Moreover, if there is sufficient space in the margin 35 to permit the synchronizing marks to be recorded therein, they need not be directly in line with the frame line but may be positioned at any location having a predetermined relation to the position of the frame line. In many instances, however, such as where two separate sound tracks are required for recording stereophonic sound information or where it is desirable to extend the frame area as nearly as possible to the edge of the record strip on the side opposite a single sound track, this may not be possible.

Also, rather than being recorded photographically, the synchronizing marks may be in the form of magnetic record segments located either between the frames or in the margin 35, in which case a magnetic detecting head would be substituted for the photocell 29. Although the provision of magnetic synchronizing marks in a photographic record strip completely eliminates the possibility of detecting patterns similar to that of the synchronizing mark in the frame area and thereby avoids erroneous initiation of the return scan, it is nevertheless, preferable to provide synchronizing marks which are of a separably different character from the recorded information in the frames so that the synchronizing mark signals can be supplied to and handled by the same reproducing circuits used for the information recorded in the frame areas of the film record.

Other elements of the apparatus utilizable to carry out the invention may be those presently used with certain modifications. In particular, conventional scanning equipment of the type described above, may be modified by merely eliminating the optical chasing apparatus. It may also be necessary to reduce at least the vertical size of the scanning spot to adapt it to use with anamorphosed images. Generally, however, the method of the invention may be practiced without extensive change or replacement of existing apparatus.

It will be understood that the above-described embodiment of the invention is merely exemplary and that numerous modifications and variations may be made without departing from the scope and spirit of the invention. For example, the above description contemplates the standard film and scanning rates presently in use in the United States. The method is, of course, readily adaptable to other standards such as those in use in other countries or to standards which may be adopted in this country in the future. Additionally, the method is adaptable to analogous record medium scanning procedures. These and other modifications of the example specifically described above will occur to those skilled in the art and are deemed to be included within the appended claims which define the invention.

I claim:

1. A method of reproducing information carried on a first record medium in a series of successive frames comprising the steps of preparing a second record medium from said first record medium in which the information on each of the frames of said first medium is repeated on at least two adjacent frames in said second record medium, conveying said second record medium through a scanning area having a dimension in the direction of the conveyance of said record medium equal to twice the pitch distance between the frames of said second record medium, and scanning said area in the direction of said conveyance with an interrogating beam, and detecting the modulation of the scanning beam by the information in the frames of the second record medium to derive two sets of electrical signals representing the information on each frame of the first medium.

2. A method of reproducing information contained on a first record medium having a first number of successive frames in a given linear dimension comprising the steps of preparing from said first medium a second record medium carrying said information in a second number of successive frames in the same given linear dimension by compressing the information in the direction of said linear dimension and repeating at least twice each of the frames of said first medium, conveying said second record medium through a scanning area having a dimenison in the direction of said conveyance equal to twice the pitch distance between the frames of said second record medium, scanning each frame of said second medium once in the direction of said conveyance with an interrogating beam, and detecting the modulation of the scanning beam by the information in the frames of the second record medium to derive two sets of electrical signals representing the information on each frame of the first medium.

3. A method of reproducing information carried on a first film medium in successive frames comprising the steps of producing a second film medium carrying said information in successive frames, the information on each frame of said first film medium being carried on at least two successive frames of said second film medium, repeatedly scanning a scanning area having a dimension in the direction of said succession equal to twice the pitch distance between successive frames of said second film medium with an interrogating beam tracing out a succession of scan lines in the scanning area with the individual scan lines thereof displaced in the direction of extent of the second film, conveying said film through said scanning area in the direction of said scanning at a rate such that a point on each of said frames traverses a distance equal to said pitch distance between successive frames during each scansion of said interrogating beam, whereby the information carried by each frame of the first film medium is scanned twice by the interrogating beam, and detecting modulation of the scanning beam by the information carried on the frames of the second film medium to derive two sets of electrical signals representing the information on each frame of the first film medium.

4. A method of scanning with interlaced raster-type scanning beams information carried on a first film medium in a first number of successive frames, the period of each scansion of said scanning beam differing from the period required to maintain the desired time relationship of said information on said first film medium, comprising producing a second record medium from said first film medium having said information carried thereon in a second number of successive frames, the information on each frame of said first film medium being carried on at least two successive frames of said second record medium, conveying said second record medium through a scanning area having a dimension in the direction of the conveyance equal to twice the pitch distance between successive frames of said second record medium at a rate such that the time relationship of the information on the first film medium is substantially unchanged, scanning said scanning area in the direction of said conveyance with interrogating interlaced raster-type beams so that each frame is scanned once, every other frame of said second record medium with a first raster-type beam and the remaining frames with a second raster-type beam interlaced with said first beam, successive scan lines of the raster-type beams being displaced in the direction of conveyance of the second record medium, and detecting modulation of the scanning beams by the information carried on the frames of the second film medium to derive two sets of electrical signals representing the information on each frame of the first film medium.

5. The method set forth in claim 4 in which said producing of said second record medium includes the step of compressing the information in each frame of said first medium in the direction of said succession.

6. A method of scanning images carried on frames of a first cinematographic film with interrogating raster-type scanning beams, the period of each scansion of said scanning beams differing from the period required to maintain the desired time relationship of said images and the images being inverted on said first film, comprising producing a second cinematographic film from said first film having each image of said first film carried in at least two successive frames of said second film and in upright position, conveying said second film through a scanning area having a dimension in the direction of the conveyance equal to twice the pitch distance between successive frames of said second film at a rate such that the time relationship of the images is substantially unchanged, scanning said scanning area in the direction of said conveyance with interrogating interlaced raster-type beams so that each frame is scanned once, every other frame of said second film with a first raster-type beam and the remaining frames with a second raster-type beam interlaced with said first beam, successive scan lines of the raster-type beams being displaced in the direction of conveyance of the second film.

7. A method of scanning images carried on frames of a first cinematographic film with interrogating raster-type scanning beams, the period of each scansion of said scanning beams differing from the period required to maintain the desired time relationship of said images and the images being inverted on said first film, comprising producing a second cinematographic film from said first film, the image in each frame of said first film carried in at least two successive frames of said second film and in erect position and said images on said second film being compressed in the direction of said succession, conveying said second film through a scanning area having a dimension in the direction of the conveyance equal to twice the pitch distance between successive frames of said second film at a rate such that the time relationship of the images is substantially unchanged, scanning said scanning area in the direction of said conveyance with interrogating interlaced raster-type beams so that each frame is scanned once, every other frame of said second film with a first raster-type beam interlaced with said first beam, successive scan lines of the raster-type beams being displaced in the direction of conveyance of the second film.

8. A record medium for use as an information carrier in reproducing information as an electrical video signal comprising an elongated record member adapted to be moved past a reproducing device in the direction of elongation and having a plurality of information-bearing segments of uniform dimension spaced uniformly in the direction of elongation of the member for sequential reproduction by a reproducing device upon motion of the member past the device, and synchronizing record means recorded on the member at locations associated with the intervals between information-bearing segments comprising a plurality of record elements of differing character disposed on the record medium in a selected spatial pattern which extends substantially parallel to the direction of elongation of the member.

9. A record medium according to claim 8 wherein each record element has a dimension in the direction transverse to the direction of elongation of the record member which is at least as great as the corresponding dimension of the information-bearing segments.

10. A record medium according to claim 8 wherein at least a portion of the synchronizing record means is recorded at locations laterally displaced from the information-bearing segments with respect to the direction of motion of the record member.

11. A record medium according to claim 8 wherein the selected spatial pattern of the record elements is of a separably different character from the spatial pattern of information recorded in the formation-bearing segments.

12. A record medium according to claim 8 wherein the record elements are uniformly spaced in the direction of elongation of the member.

13. A record medium according to claim 8 wherein the information contained in each segment is compressed in the direction of elongation of the member.

14. A record medium according to claim 8 wherein the information contained in each segment is in pictorial form and the bottom edge of the picture in each segment is the leading edge with respect to the direction of motion of the member.

15. A record medium for use as an information carrier in reproducing information as an electrical video signal comprising an elongated member adapted to be moved past a reproducing device in the direction of elongation and having a plurality of information-bearing segments of uniform dimension in the direction of elongation and arranged in succession in the direction of elongation for sequential reproduction, wherein the information in each segment is compressed in the direction of elongation of the member and wherein the information in each segment is repeated in at least one adjacent segment.

16. In apparatus for reproducing information, the combination of:

an information-carrying record medium including an elongated member having a succession of information-bearing segments of uniform dimension in the direction of elongation, and synchronizing record means disposed on the medium at locations associated with the intervals between information bearing segments comprising a plurality of record elements of differing character disposed on the record medium in a selected spatial pattern which extends substantially parallel to the direction of elongation of the record medium;

means for conveying the record medium in the direction of its extent through a scanning area having a dimension in the direction of conveyance of the record medium equal to twice the pitch distance between successive segments of the medium;

scanning means for generating a raster-type scanning beam for interrogating each of the information-bearing segments of the record medium in the scanning area, the scanning beam comprising a succession of scan lines with each thereof being displaced in the direction of record medium conveyance;

first photosensitive means responsive to modulation of the scanning beam by the information carried by the record for producing an electrical signal representing the information in each segment of the record medium;

means for illuminating a portion of the path traversed by the synchronizing record means as the record medium is conveyed through the scanning area to generate a modulated light signal; and second photosensitive means responsive to the modulated light signal to generate a synchronizing signal indicative of the rate at which the record medium segments are conveyed through the scanning area.

17. Apparatus as set forth in claim 16, in which:

the record medium carries information that has been recorded on a first film medium in a succession of frames, with the information in each of the film medium frames contained on at least two adjacent segments of the record medium, and wherein the scanning means generates, in addition, a second raster-type scanning beam with the individual scan lines thereof interlaced with the scan lines of the first raster-type beam, the periodicity of the raster beams being such that each of the raster beams scans alternate information-bearing segments of the record medium once in the scanning area.

18. Apparatus as defined in claim 17, further comprising:

means responsive to the synchronizing signal for controlling the periodicity of the raster-type beams so that each record medium segment is scanned once in the scanning area by one of the interlaced raster-type beams.

19. Apparatus as defined in claim 16, in which:

the record elements of the synchronizing record means are uniformly spaced in the direction of elongation of the record medium and the second photosensitive means generates a synchronizing signal that is a periodically varying waveform of substantially constant frequency.

20. Apparatus as defined in claim 16, in which:

the record medium carries information that has been recorded on a film medium in a succession of frames, the information on alternate frames of the film medium being disposed on the record medium in a different number of successive segments, respectively, and the conveying means transports the record medium segments through the scanning area at a rate different than the rate at which the film medium was recorded to maintain the time relation of the information reproduced from the record medium.

21. A record medium according to claim 16 wherein the synchronizing record means are located between an edge of said film and said respective frames.

22. A record medium according to claim 16 wherein the synchronizing record means are located between adjacent frames.

23. A record medium according to claim 16 wherein the synchronizing record means are located between adjacent frames and each comprises a plurality of indicia spaced apart transversely of said record medium.

24. A record medium according to claim 23, further comprising a sound information strip disposed on the member to extend longitudinally thereof adjacent the information bearing frames.

25. A record medium according to claim 16 wherein the information in each frame is compressed in the direction of elongation of the member.

26. A record medium for use as an information carrier in reproducing as a video signal, by television techniques employing a given field scanning rate, information recorded on an original medium employing a frame rate different from said field scanning rate, comprising an elongated member adapted to be moved past a reproducing device in the direction of elongation and having a plurality of information bearing frames of uniform dimensions spaced uniformly in the direction of elongation of the member for reproduction in a given sequence upon motion of the member in one direction past the reproducing device, the information in each frame being in pictorial form with the bottom-to-top direction of the picture the same as the direction along said member established by said reproduction sequence, and the pictorial information in a given succession of frames including the pictorial information contained in a different succession of frames of said original record with repetition of each of said frames of said original record on at least two adjacent of the record medium and further repetition as required to depict in said given succession of frames essentially the same sequence of information as contained in said different succession of frames of said original record medium, said given and said different successions of frames being in the ratio of said field scanning rate to said different frame rate, respectively, and a plurality of synchronizing record means formed on the member in predetermined relation to the intervals between each of said frames with each of the record means displaced from the others in the direction of record medium elongation.

References Cited

UNITED STATES PATENTS

| | | | |
|---|---|---|---|
| 2,189,351 | 2/1940 | Schröter | 178—7.2 |
| 2,818,466 | 12/1957 | Larson | 178—7.2 |
| 2,947,810 | 8/1960 | Horsley | 178—6.7 |
| 3,051,777 | 8/1962 | Lemelson | 178—6.6 |

FOREIGN PATENTS

| | | |
|---|---|---|
| 136,936 | 4/1950 | Australia. |

ROBERT L. GRIFFIN, *Primary Examiner.*

H. W. BRITTON, *Assistant Examiner.*